US006836548B1

(12) United States Patent
Anderson et al.

(10) Patent No.: US 6,836,548 B1
(45) Date of Patent: Dec. 28, 2004

(54) COMMUNICATIONS SECURITY AND TRUSTED PATH METHOD AND MEANS

(75) Inventors: Mark Stephen Anderson, Salisbury (AU); John Desborough Yesberg, Salisbury (AU); Damian Marriott, Salisbury (AU); Lisa Nayda, Salisbury (AU); Ken Hayman, Salisbury (AU); Malcolm Stevens, Salisbury (AU); Brendan Beahan, Salisbury (AU)

(73) Assignee: The Commonwealth of Australia, Canberra (AU)

( * ) Notice: Subject to any disclaimer, the term of this patent is extended or adjusted under 35 U.S.C. 154(b) by 1826 days.

(21) Appl. No.: 07/970,556

(22) Filed: Nov. 4, 1992

(30) Foreign Application Priority Data

Nov. 5, 1991 (AU) ............................................ PK9153

(51) Int. Cl.[7] .............................. H04L 9/28; H04K 1/00
(52) U.S. Cl. ......................... 380/28; 380/255; 380/257; 380/277; 380/287; 713/150; 713/168; 713/170; 713/182; 713/200; 713/201
(58) Field of Search .............................. 380/2, 4, 9, 21, 380/23, 25, 28, 30, 43, 49, 50, 200–242, 252–255, 257, 259, 260–266, 277, 29, 287, 59; 340/825.31, 825.34; 713/150–154, 160–168, 170, 171, 176, 180, 181–186, 189–202

(56) References Cited

U.S. PATENT DOCUMENTS

| | | | |
|---|---|---|---|
| 4,819,267 A | | 4/1989 | Cargile et al. ................. 380/23 |
| 4,885,789 A | * | 12/1989 | Burger et al. ................. 380/25 |
| 4,918,653 A | * | 4/1990 | Johri et al. ......... 340/825.31 X |
| 4,945,468 A | | 7/1990 | Carson et al. ............... 395/700 |
| 5,276,735 A | * | 1/1994 | Boebert et al. ............... 380/21 |
| 5,283,828 A | * | 2/1994 | Saunders et al. ........... 713/192 |

FOREIGN PATENT DOCUMENTS

| | | | | |
|---|---|---|---|---|
| EP | 0174016 | | 3/1986 | ............. G06F/7/10 |
| EP | 0246823 | | 11/1987 | ............. H04L/9/00 |
| EP | 0325776 A2 | * | 8/1989 | ............. G06F/9/46 |
| EP | 0326699 A2 | * | 8/1989 | ............. G06F/9/46 |
| EP | 0326700 A2 | * | 8/1989 | ............. G06F/9/46 |
| EP | 0443423 A2 | * | 8/1991 | ........... G06F/12/14 |
| GB | 1486340 | | 9/1977 | ......... G06K/15/18 |
| WO | 870397 | | 7/1987 | ............. G06F/1/00 |

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A trusted path device is described which may be used stand alone or may be retrofitted to a users untrusted computer console or workstation so that an untrusted data input may be displayed on an untrusted display and verified by the user, following which the trusted data can be output to an untrusted or trusted device or network. The output may be encrypted or not, by means of an encryption device which may or may not use a 'one time pad' key provided from a structured array of retrievable "one time pad" keys having associated uniquely there with, a serial number which itself need not be encrypted but with which the input data and encrypted output data are uniquely associated. Sufficient "one time pad" keys are provided on a commonly available and physically manageable medium so as to allow much simplified key management procedures while still maintaining high levels of correctness and effectiveness of the encryption processes. Trusted devices as per ITSEC Level 6 may be used to implement the trusted path and encryption devices since the apparatus according to the invention are inherently simple in functionality thereby simplifying conformance with the relevant ITSEC and security equivalent requirements.

58 Claims, 6 Drawing Sheets

COMMUNICATIONS SECURITY AND TRUSTED PATH METHOD AND MEANS

This invention relates to securing data from misappropriation, unauthorised change as well as ensuring the integrity of data that is prepared and communicated internally and externally of a data processing device or network, whether the network is trusted or not.

BACKGROUND

In the context of information technology IT security equates to confidentiality, integrity: and availability and every IT product and network, has its own level of security. To achieve and maintain a particular level of security, the product or every element of a network will involve the implementation of one or more security functions, for example, control of access to the product or network, both physically and in the data sense, transaction auditing and detection and recovery from breaches of the security which is in place.

However, even if a particular level of security exists, there must also be a commensurate assurance in these security functions, i.e. confidence in the correctness of the security functions (development and operation functions) and confidence in the effectiveness of the security functions.

There exists a number of IT security evaluation criteria which address these security function issues, for example the Trusted Computer Systems Evaluation Criteria (TCSEC) "Orange Book" used by the US Department of Defence, the UK CESG3, the German ZSiEc as well as the Joint European Information Technology Security Evaluation Criteria (ITSEC).

To provide a realistic requirement for applying any form of security evaluation criteria there should also exist a realistic description of the operational requirements and the security threats that are to be countered (real world and assumed). These considerations along with the overall security objectives and well known security mechanisms becomes the security evaluation target of the IT security product or system that will be suitable for use in a security environment.

It is an aspect of this invention to provide an IT product which equals or exceeds the ITSEC security evaluation criteria level E6 which will allow the product to be used in a wide variety of security environments.

One such security target relates to the aim of providing an IT product which will allow the interconnection of networks with differing classification levels. For example, there is a defence requirement for top secret compartmented networks to be interconnected with secret networks (FIG. 1) so that appropriately classified data (e.g. unclassified to secret) may flow from the top secret network to the secret network while maintaining a bar to the flow of top secret data from the top secret network to the secret network. There must be a high level of assurance that both the hardware and software will not compromise data held in the top secret network by passing inappropriate data items to the secret network which includes the possibility of malicious logic (e.g. trojan horses) or security flaws in computer hardware or software in the top secret network which may be used to leak data to the secret network.

One way of achieving the necessary assurance for the aforementioned target is to ensure that all computing equipment, hardware and software, is evaluated to an appropriate ITSEC level, in this case at least E6.

Due to the stringent nature of the evaluation criteria at E6 level, it is unlikely that a product of similar utility to that of, for example, a general purpose workstation which is classified as an untrusted device by all security evaluation criteria, could be made available. However, with the ever increasing complexity of the message content and level of communications between workers involved with classified material it is desirable that such equipment be available. Ideally, a product such as a workstation would meet the requirements of level E6 and still remain functionally similar to an untrusted workstation.

As well as complex data there is often the need to prepare for transmission, data which is seemingly of a simple nature, but for which the highest level of integrity is required. An example of a message which must have high integrity is of the nature of an order from a commander to "launch a missile at target 23511". The message must be verifiable as to its source and must have the highest level of integrity in respect of the content of the message.

Ideally there must exist a secure means of controlling the transfer of messages input to a display, so that only the message displayed which must be visually verified by the sender will be transmitted, thereby ensuring the integrity of its content. This then leaves the user to be responsible for taking appropriate steps to verify themselves as a legitimate source of the message.

Thus it is a desirable aspect of security related devices when used with a non E6 level compliant (which for the purposes of this discussion is considered as untrusted) device, for example a workstation, to have provided a trusted path between the message input, the display, the human verifier, and the message output of the device. A trusted path for high integrity information is then created using elements of a previously untrusted devices and its normal functions for their preparation.

However, having prepared a high integrity message, there still exist many security threats, in relation to message interception and unauthorised interpretation. To counter these threats, apart from well known physical security measures, there exist a number of security functions which can be applied to the message itself, to remove or reduce these threats.

The most common and typically most easily applied is the use of an encryption algorithm, having a predetermined key. When the encrypted message is received at its destination, a decryption algorithm is applied using the same predetermined key to extract the original message.

There are many encryption and decryption algorithms, however, only the "one time pad" key system has an unquestionable assurance of confidence and effectiveness against unauthorised decryption. A "one time pad" system uses a random key for each matching data item sent.

Currently, this approach is only used in very limited circumstances and is impractical for widespread use, due to the unmanageable nature of the large number of keys that would be used and the difficulty of coordinating the use of the same random key at each end of the information exchange.

Thus it is a further desirable aspect of the invention to provide a data encryption device which uses the preferable "one time pad" encryption system, but which overcomes the mass storage, coordination, and distribution problems of the typical implementation of this type of scheme while still meeting a security evaluation criteria level of E6 or greater.

Thus the combined use of data integrity and encryption elements would provide a message having a high integrity with regards to its content and unquestionable assurance that the message has not been decrypted.

The invention thus may comprise two devices, an encryption device and a trusted path device. A encryption device for encryption of an input data may comprise a mass storage device adapted to store a plurality of random keys for use in the encryption process as required.

A trusted path device may be incorporated or retrofitted to standard data processing devices. The device will provide an assurance that various security critical functions carried out by a user cannot be bypassed or tampered with by the hardware or software of the untrusted device which could otherwise compromise the function of the data processing device to which the trusted path device is attached.

In a broad aspect, the invention is a trusted path device for controlling the transfer of received data between an untrusted data input means, an untrusted visual display means adapted to display signals from an external source and a data output means, comprising, a trusted visual display interface control means for transferring said received data from said untrusted data input means to said untrusted visual display means and controlling said display to display said received data on said untrusted display, an untrusted verifier means having at least one user operable input signal actuator whereby a first signal output from said verifier means occurs upon actuation of a trusted first one of said actuators representative of a visual verification by the user that the data displayed on said untrusted visual display means, is received data, and a trusted control means adapted for receiving verifier means output and upon receiving said first signal output transferring said received data to said data output means.

In a further broad aspect of the invention a trusted encryption device comprises a trusted control means, a trusted data input means for accepting received data comprising a data portion and a uniquely associated data string comprising a serial identifier, an untrusted mass storage means for retrievably storing a plurality of data items, said items comprising at least one encryption key part which is uniquely associated with a data string comprising a serial identifier, a trusted data string verifier means having at least two registers, a first register containing a current serial identifier and a second register containing a serial identifier bound, wherein said control means adapted to determine whether said serial identifier in said received data is within the range determined by said current serial identifier and said serial identifier bound, in which event said control means (i) stores in said first register a current serial identifier calculated by incrementing said serial identifier in said received data a predetermined series increment towards said serial bound identifier, (ii) retrieves from said untrusted mass storage means a key part uniquely associated with said serial identifier in said received data, encrypting said data portion of said received data according to a predetermined encryption algorithm with said key part, and (iii) outputs an encrypted data portion having a uniquely associated said serial identifier.

In a further broad aspect of the invention a method of encrypting data comprises a method of encrypting data comprises the steps of a) storing a plurality of data items each comprising at least one encryption key, each of said keys being uniquely associated with a data string comprising a serial identifier in an untrusted mass storage device, b) storing a serial identifier bound in the first register of the trusted serial number verifier means, c) storing a current serial identifier in a second register of said trusted serial number verifier means, d) providing data input to a trusted control means comprising a data portion to be encrypted and a uniquely associated serial identifier, e) comparing in said trusted control means said serial identifier portion of said data input to said serial identifier to determine whether they are equal and whether said serial number portion is greater than or equal to said serial identifier bound, f) obtaining from said untrusted mass storage device a data item having an encryption key uniquely associated with said current serial identifier, g) adjusting said serial identifier in said received data a predetermined series increment towards said serial identifier bound, h) encrypting in said trusted control means said data portion of said data input uniquely associated with said current serial identifier, with a predetermined encryption algorithm using said random encryption key, and i) said trusted control means providing a data output comprising an encrypted data portion associated with said serial identifier.

DETAILED DESCRIPTION OF AN EMBODIMENT OF THE INVENTION

Figure 1:
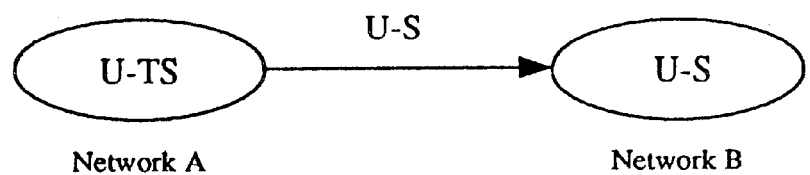
FIG. 1 depicts an inter-network message exchange environment where unclassified to secret data may flow from a top-secret network to a secret network.

FIG. 1 depicts network A which contains Unclassified to Top Secret information and it is important that only Unclassified to Secret information is transferred to network B which is not authorised to process or store Top Secret information.

For the purposes of this description the term trusted device will be used to refer to a device which, while being used in the context of its security evaluation target, has or exceeds compliance with level E6 of the ITSEC standard, while the term untrusted device will be used to refer to a device if it or any part of it does not need to equal or exceed level E6 requirements. However, the choice of Level E6 of the ITSEC standard is a choice determined by the user of the invention and other standards and levels may be used as the environment determines.

Encryption Device

Figure 2:
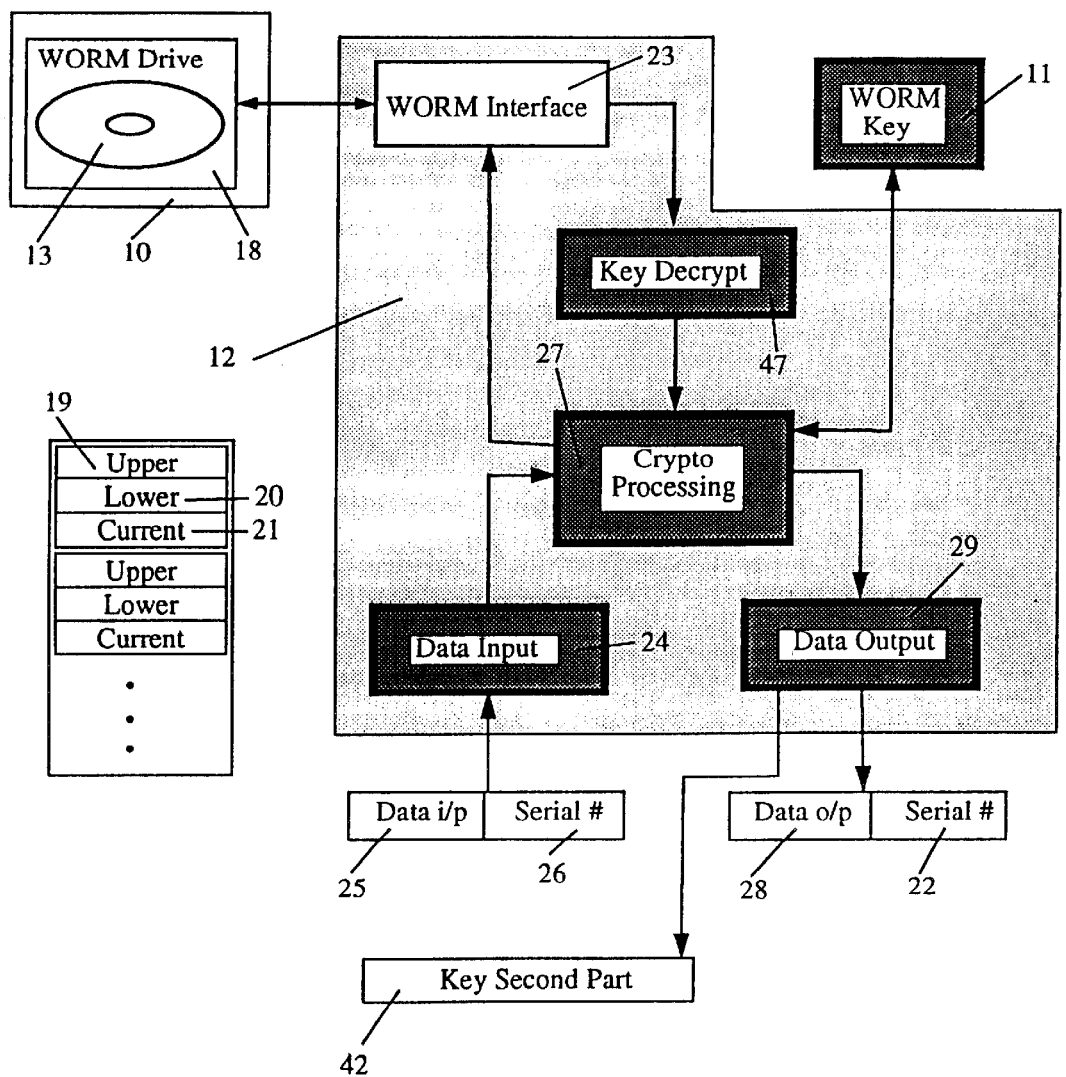
FIG. 2 depicts a functional block diagram of an encryption device.

The purpose of the encryption apparatus depicted in FIG. 2 is to accept plain text data and output encrypted data. The device comprises three main elements, a key storage device 10, a serial number verifier 11, and an encryption-device 12.

Figure 3:
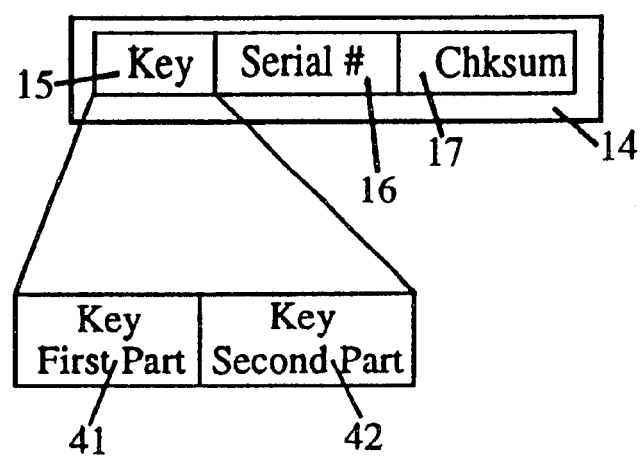
FIG. 3 depicts the structure of the main data items which comprise the data construction used on the worm drive.

The key storage device 10 comprises in this embodiment an optical disk drive 18 and an optical disc 13 which contains a plurality of data items 14 (refer FIG. 3). Each data item contains a key portion 15 comprising a random number (not pseudo random), a unique serial number 16 (e.g. created from a number representation based on 64 bits of data) and a check sum 17 which is a suitable one-way function of the key portion 15 and unique serial number 16 and/or the checksum is created from cipher block-chaining of the data item 14 and the successor data item. The optical disc 13 may be of a Write Once Read Many times (WORM) type so that used data keys can be permanently obliterated after use (e.g. changed to 0000 . . . 0). However, this may be an optional feature, depending on the requirements of the particular environment in which the device operates, However, the permanent obliteration of used keys would be mandatory in some specialised security environments but not required in other environments.

Each key portion 15 maybe further decomposed into two logical items designated key first part 41 and key second part 42.

In another version of the encryption and trusted path devices, the key storage device 10 need not store a serial number with every random key supplied thus allowing a higher density of key storage. For example, a serial number could be prefaced to a group of keys and checksums. After this group could follow another serial number which forms the logical successor to the serial number which in the previous version would have appeared with the last key in the group.

An optical disc 13 is portable and small thereby easy to distribute and provides more than sufficient storage capacity for the quantity of keys to enable practical quantities of message or other data to be encrypted over an extended period by the keys stored thereon.

The optical disc 13 is read using an untrusted conventional optical disc drive 18. It is a desirable aspect of the total encryption device that such an untrusted mass storage device can be used without impinging on the E6 compliance level of the device. It would be unduly difficult and expensive to construct a trusted (i.e. E6 or greater compliant) disc drive.

One version of the invention requires the random key 15 itself to be encrypted before its storage on the optical drive 13. This extra level of encryption may be mandatory in some specialised security environments.

The serial number verifier 11 comprises in this embodiment, at least two serial number registers, a currently useable serial number and a serial number towards which the currently useable serial number may progress. In this embodiment there are three registers: register 19 contains an upper bound of predetermined serial numbers allocated to the verifier user; register 20 contains the lower bound of predetermined serial numbers allocated to the verifier user, and register 21 contains the currently useable serial number.

Each of the serial numbers contained within the verifier is in plaintex.

The verifier 11 may contain several sets of registers with similar functions to 19, 20, and 21. However, the ranges specified by any two registers which have a function similar to 19 and 20 must be disjoint.

The verifier 11 is a physically detachable device which can be plugged into the encryption device 12 and, in accordance with suitable physical security procedures, is issued, with its own unique register values, to one or more personnel. Register 19 and 20 may be resident in a ROM while register 21 may be resident on a nonvolatile random access memory (NVRAM). In an alternative version, the serial number verifier 11 has some of its contents encrypted. The items which are encrypted can comprise all of the contents.

If the contents of the verifier are encrypted, then alternative hardware technology may be used, for example, smart cards. This allows the primary interface to the smart card and the encryption device to be untrusted without, impinging on the overall trust of the process or the encryption device. No processing of unencrypted data takes place on the smart card. Hence in this alternative, the verifier can be untrusted.

Power to actuate the reading of these registers is derived from the encryption device 12 as is the power to overwrite the content of register 21 when the next serial number is being used.

The encryption device 12 comprises a key storage device interface 23 which in this embodiment is an interface and which is adapted to control and receive from the key storage device 10 data items 14 via the standard output of drive 18. Interface 23 may itself be an untrusted portion of the device.

The encryption device 12 further comprises a data input module 24 which is adapted to receive plain text data 25 comprising the entire message and an associated serial number 26 from the user of the encryption device. The untrusted host may supply the necessary serial number from a database and the user verifies it along with the message.

An alternative method of operation entails the use of serial number verifier 11 to supply the current serial number from register 21 each time text data is input to module 24. However, in this embodiment the serial number 26, since it is also in plain text, is passed unchanged to the storage device interface 23 via the crypto-processing module 27. This module 27 is responsible for a variety of functions as depicted.

Upon receipt of a plain text serial number 26 the interface 23 commands the disc drive 18 to read not only data item 14

(FIG. 3) associated with that serial number but also obtains the successor data item and provides these two data items to the crypto-processing module 27 shown in FIG. 2 via module 47.

One of the variety of functions performed by module 27 is to check that the plain text serial number 26 is greater than or equal to the serial number 21 contained in the current serial number register, and less than the serial number 19, and greater than or equal to the serial number 20.

Another function performed in the crypto-processing module 27 is to determine whether the checksum 17 of data item 14 is as expected, to establish the integrity of the random encryption key 15 which is associated with serial number 16. Depending on the checksum algorithm used, calculation of this checksum may require the successor data item. In this embodiment of the invention, the checksum algorithm used does not require the successor data item.

The successor data item is typically a single increment of the series of serial identifiers, however, it may be a predetermined two times or some other multiple times a single increment of the series of serial identifiers being used. Generally, the increment is in a direction towards an upper bound of the serial identifier, however, it may also be towards a lower bound. Further more in general the serial identifiers are a numeric series, however, they could be formed from any suitable series of identifiers (e.g. alphas, alpha-numerics, etc.).

Having checked the integrity of the key 15, the current serial number register 21 is set to be the successor to the serial number 26. If the any of the aforementioned conditions are not met, the device signals the host to which it is attached that an error condition prevails and the encryption process is not completed. Each set of registers in the verifier 11 are checked until the appropriate conditions are met, or, in the case that no set of registers satisfies the conditions, an error condition is signalled. The serial number 22, output from 29 is equal to the serial number 26.

In accord with another embodiment of the encryption device the key decrypt module 47 implements a decryption algorithm to decrypt the key 15 obtained from the optical disc.

The crypto-processing module 27 finally performs the function of encryption by a security-environment suitable algorithm using the key 15 with the data input 25 to produce encrypted data 28, which is provided to the user or any other suitable trusted or untrusted device or network, via the data output module 29. The particular encryption algorithm used may be of any predetermined kind of the many that are available. The complexity or otherwise of the algorithm is not crucial since in effect a "one time pad" key is being used.

In this embodiment the simplest of bit wise exclusive-OR algorithms is used to provide an encrypted data 28. A simple algorithm is justified because of the use of a "one time pad" key and also, since it is advantageous to use simple logical operations in trusted devices.

The output from the encryption device 12 may include the serial number 16 along with the encrypted data 28.

The method of operation described thus far shall be known as mode A.

In a further operating mode, designated mode B, the crypto-processing module 27 first receives a serial number 26 via 24 and retrieves the associated key 15. The key second part 42 is then output by 29. The crypto-processing module 27 then receives the data input 25, encrypts the resultant bit string with the key first part 41, and then outputs via 29 the encrypted data 28 and serial number 16. The minimum number of bits in key first part 41 is dependant on the encryption algorithm used. The size of the key first part 41 must have an equal or greater than number of bits than the elements which are encrypted if the "one time pad" method of encryption is used. In this particular version of the embodiment of the invention, the number of bits in key first part is equal to the number of bits of the concatenation of the data 25 with the key second part 42.

Decryption of data can take place at a receiving device by simply proffering the data to the ciphertext device with the appropriate serial number and an instruction to operate in mode A.

The purpose of having a plurality of sets of registers in the serial number verifier 11 is to allow transmission and reception "bands". More precisely, a user can transmit text using one or more ranges of serial numbers, and can also receive from one or more ranges. It may be that a user would have one transmission range, and a separate and disjoint reception range for each user from which messages may be received. It is possible with the given arrangement of the ciphertext device formed by the components 10, 12, and 11 to set up hierarchical and flat access control policies In practical terms the encryption apparatus depicted in FIG. 2 comprises a collection of trusted and untrusted devices. By design, the only untrusted devices are the key storage device 10, the key storage interface 23 and, depending on the operating requirements, the devices 24 and 29 used to supply the plain text input data at 24, and accept the encrypted data 28, serial number 16, or key second part 42 output from 29.

The remainder of the apparatus is trustable by virtue of its compliance to E6 level or greater in ITSEC. Such a compliance implies not only stringent design, mathematical, material, construction and operational standards, it also implies that such an apparatus will be used in accord with strictly enforced procedural guidelines.

In this embodiment, the previously described elements of the encryption device are controlled by a finite state automaton implemented in a set of programmable gate arrays, housed in physically tamper resistant assemblies and enclosures.

Trusted Path Device

The data encryption device described above is of further worth if encryption of messages is used to provide confidentiality, but of limited worth if there is a risk that the message to be sent lacks an assurance that it is correct. That is, its contents must not have been changed in any unauthorised way, and must be correct in every detail, including its security level (classification assignment) and the authority (digital signature) by whom it is created and sent.

Therefore, there is also a need for a device upon or with which these types of messages can be created. Specialist devices built to the ITSEC or other security level standards are available which provide a set of keys and symbols which are a subset of the myriad of keys and symbols used by security conscious personnel, some of whom are specialists in their fields, dealing with quite unique message content and formats (e.g. scientific, engineering symbols, etc.). Ideally, the normal tools of trade such as maintenance terminals, workstations and personal computers would be better suited to creating these messages, however the task of producing an E6 level security device capable of operating in these myriad of applications and conditions is prohibitively difficult and/or expensive.

Therefore there exists a need to provide a device which can interface with a standard untrusted device such as a work station and by controlling its display and certain inputs and outputs, provide a trusted path for the creation of a message which can be assured of having the necessary integrity to be a trusted message for transfer to a trusted network or a suitable encryption device, not necessarily a device of the type, described previously, however ideal that may also be.

The device, referred to hereafter as a Trusted Path System (TPS) device, is implemented in this embodiment, by interposing a trusted device between the standard untrusted display of the computer and the computer itself used by the person compiling a message, as well as accepting the data which is input by the user so that it may control the output of the computer, and control what the computer displays, and therefore ensure that the user sees what they would expect to see if it were interacting with the display via an untrusted computer interface. The TPS device also has inputs and outputs which may be adapted to respectively receive and provide messages from and to an external message transmission network which may or may not require encryption processes to be applied to the message.

In normal operations using the untrusted computer device, the TPS device is transparent to the user. When the TPS is required for secure message creation or reception, the TPS device is activated for the reception of input data The TPS device is configured to allow direct operator access to visual verification, using the untrusted devices' standard display and a User Input Module (Verifier) 39, which also provides the means to append message classification and digital signatures to the message. This verifier is quite different from that of the earlier described verifier 11 of FIG. 2. The earlier mentioned verifier is used in the described embodiment to verify the currency of a desired serial identifier (serial number) where as the present verifier is used to indicate the validity of a message displayed on a visual display.

Only data which is processed by the TPS device is therefore displayed and only that data is passed externally. This may be to an encryption device.

Thus, such a system allows untrusted computer devices to connect to trusted networks.

Figure 4:
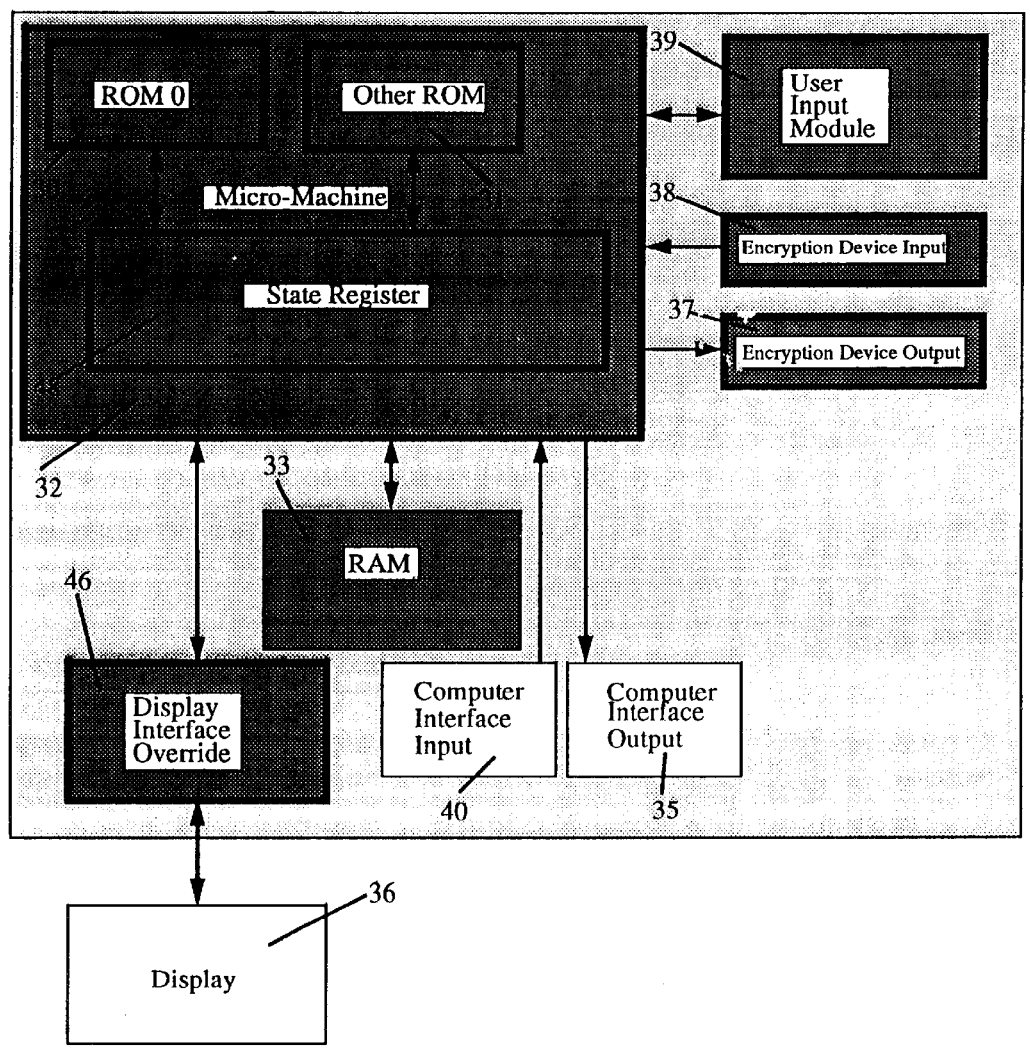
FIG. 4 depicts a functional block diagram of the Trusted Path Device.

FIG. 4 depicts both a) a nonbypassable, trusted communication path between the user of a computer to which the device is attached and security operations implemented in the TPS device and b) a trusted path to external devices and networks.

In this embodiment the trusted processing means is provided by a micromachine 32 which carries out specified security functions depending on inputs indicated from verifier 39. Them micromachine 32 is controlled by a microcoded state machine.

The ram 33 is a static Random Access Memory for example, frame buffer contents.

The user input module 39 is a device with which a user can signal instructions to the micromachine 32. The micromachine 32 can also signal certain status indications to 39. In one application of the TPS device, the user input module 39 is implemented as a bank of switches and lights. Each switch is typically used exclusively by the user upon actuation by that user to provide a signal representative of one of a number of functions which may include, verification of the displayed message, provision of a predetermined unique user signature for use with the received data message or a predetermined data classification which maybe uniquely associated with for example the received data message.

The computer interface module 40 is an untrusted interface which may take data from a host computer to which it is connected and conducts message protocol and format translation for input to the micromachine 32 alternatively the micromachine may receive such input direct.

The computer interface module 35 is an untrusted interface which may connect and convert the message formats and protocols from the micromachine 32 to the host computer or network.

The input module 38 is used to receive information from an external device, for example, an encryption device, and convey it to the micromachine 32. Alternatively the module 38 may be adapted to receive data messages from external trusted and/or untrusted networks.

The output module 37 is used to convey data from the micromachine 32 to an external device, for example, an encryption device. Alternatively, the module 37 may be adapted to send data messages to external trusted and/or untrusted networks. In each case these devices are preferably trusted.

The display 36 is an untrusted frame buffer device which forms, part of the display of the host computer. It accepts and transmits data to and from a trusted visual display interface in this example a Display Interface Override 46.

In one desirable application of the TPS device, data in the form of messages is received from the computer interface 40. The device calculates a tamperproof checksum for the message. The checksum is then returned to the host computer through interface 35.

The micromachine 32, on receipt of a message through interface 40, instructs the display interface override module 46 to capture and store all data held in the display frame buffer 36 in the ram 33 via the micromachine 32. The micromachine 32 then instructs module 46 to place the message in the frame buffer 36 for display to the user. The user may then signal via module 39 whether the message meets the desired properties, typically as to whether the message is as was entered by the user and whether it is of an appropriate classification. Using module 39, the user can also signal to the micromachine 32 the desired classification of the message or append a predetermined digital signature.

The following series of steps can be implemented as part of the operation of a suitable encryption device, and in effect, decreases the reliance on the secrecy of the checksum algorithm implemented as part of the checking process associated with restricted message exchange.

The micromachine 32 may use a serial identifier preferably a serial number obtained from the host computer via 40 to obtain from the encryption device an associated key second part 42. After concatenating the key second part 42 to the inputted message and any other data classification and/or signature, the micromachine 32 calculates a checksum for appending to the message key second part pair.

The ram 33 may also be used for storage of intermediate values generated during the calculation of the checksum. The calculated checksum concatenated with the key second part 42 is passed to the encryption device via module 37 and the data input module 24 for encryption with the key first part 41. The encrypted checksum, key second part pair is returned to the host computer via the output module 35 and module 38. The micromachine 32 then restores, the original display contents which were saved in the RAM 33.

If the previous optional steps are not implemented, then the following steps maybe taken. The micromachine 32 calculates a checksum based on the serial number obtained from the host computer via 40 and the inputted message. This checksum is then passed to the external encryption device via the data input module 24 of FIG. 2 for encryption via module 37. The encrypted checksum is returned to the host computer via module 29 and output module 35. The micromachine then restores the original display contents which were saved in RAM 33.

The checksum algorithm used must be suitable for the task and must itself be kept secure.

The display of the message through the use of the TPS device which is constructed to have a greater than ITSEC level E6, will enable the user to have a high level of assurance, that the message is as it appears on the display.

In order to verify the properties of the micromachine 32 to a high degree of assurance which exceeds ITSEC level E6, it is preferably implemented by a finite state automata in programmable gate arrays, including, for example, Read Only Memories.

The design of modules 32, 33, 37, 38, 39, and 46 require that their operations are verifiable to a level exceeding ITSEC level E6. As a result, the assurance level of the TPS device as a whole can be evaluated to a level exceeding E6.

Since the display frame buffer 36 is under the control of the TPS device, the host computer cannot subvert the trusted path by attempting to display incorrect data when the user is made aware by the TPS device that it is displaying the data. However is theoretically possible for a hardware trojan horse to be implanted in the frame buffer device so that it can be triggered not to display certain data when a specific code is given. Hence in the highest national security environments a trusted frame buffer may also be required.

Although it will be apparent to those skilled in the art that the principles described herein are applicable at any desirable level of security in respect of the hardware, and thus, although the very high ITSEC E6 level used as an example and the configurations, described by way of example are configured for certain characteristics and requirements of this particular environment, it is also possible for these principles to be applied to lower levels and indeed future higher levels of security to ensure the correctness and effectiveness of the security these devices provide.

Furthermore, the worth and security of any Information Technology system is wholly dependent on the procedures and enforcement of physical security measures which must be applied in concert with the IT system at the users disposal.

Display Variant

Figure 5:
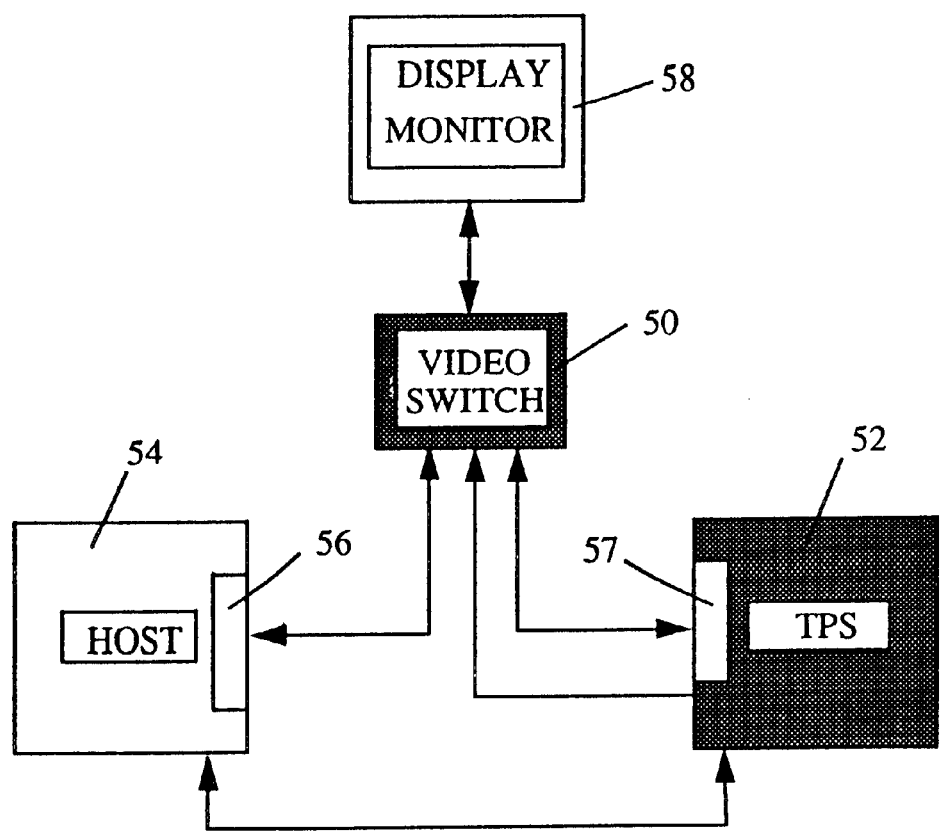
FIG. 5 depicts a functional block diagram of a controllable video switch device connected to a display monitor, a host, and a Stub device.

A variant to the display override is to construct a video switch 50 as depicted in FIG. 5 so that the TPS device 52 can command the switch to pass data from the trusted display frame buffer 57 in the TPS 52 rather than the host machine's 54 frame buffer 56.

In an embodiment of this variation to the invention the TPS controls a frame buffer video card 56 directly. The output from this card and the output of the host computer are both fed into the video switch unit 50. The output from the video switch is fed into a display monitor 58. Typically, this will be the display monitor normally attached to the host computer 54. Typically, a fibre optic input to the video switch from the TPS 52 controls a bank of switch means typically relays which may be either electromechanical or solid state which connect either the hosts video output to the display monitor 58 or the TPS device's output. In this embodiment of the video switch provides four relays which are used to switch Red, Green, Blue, and Sync signals.

In a further variant of the video switch arrangement, the cables and interface circuitry can be changed to accommodate different cable and receptor plugs and the control input may not be fibre optic, but rather electronic. The fibre optic solution was chosen for its superior resistance to unauthorised inductance coupling along the cable path to prevent unauthorised control of the switch 50.

In another embodiment of the invention, a multi throw relay may be used to switch as many signals as required, whether they be RGBS, RGBH (Horizontal)V(Vertical), RGB, Composite, or any other formal. In addition, the video switch may be implemented physically as part of the TPS 52.

The video switch mechanism has the advantage of allowing different frame buffers developed by different manufacturers to be employed. It also can remove the need to store the contents of the display screen. However, use of the video switch can cause the overall TPS device and system to be more expensive than a TPS device with an override mechanism unless large production quantities are considered.

Trusted Path Variants

Micromachine Variant

In another embodiment of the invention, the micromachine state register 48 is implemented as a bit slice microprocessor that receives microinstructions from the microword roms 30 and 31. The microprocessor comprises bit slice ALU chips that can be obtained commercially, and control units which comprise programmable logic chips or a construct of fixed, random logic. In this variant, the contents of the rom 30 and 31 would be different so as to reflect the different control and data paths. Other obvious variants would be the removal of either rom 30 or rom 31 so as to have a single, logical bank of rom. The purpose of having two separate roms is to aid in the verification process but is not strictly necessary. This also applies to the earlier version of the TPS device.

Although the bit slice microprocessor design can be verified to a level exceeding E6, it would be relatively less trusted than a finite state automaton design implemented in FPGA's or other programmable logic comprising chips such as Xilinx gate arrays.

TPS Device Fitted with an Alternative Crypto Engine

Figure 6:
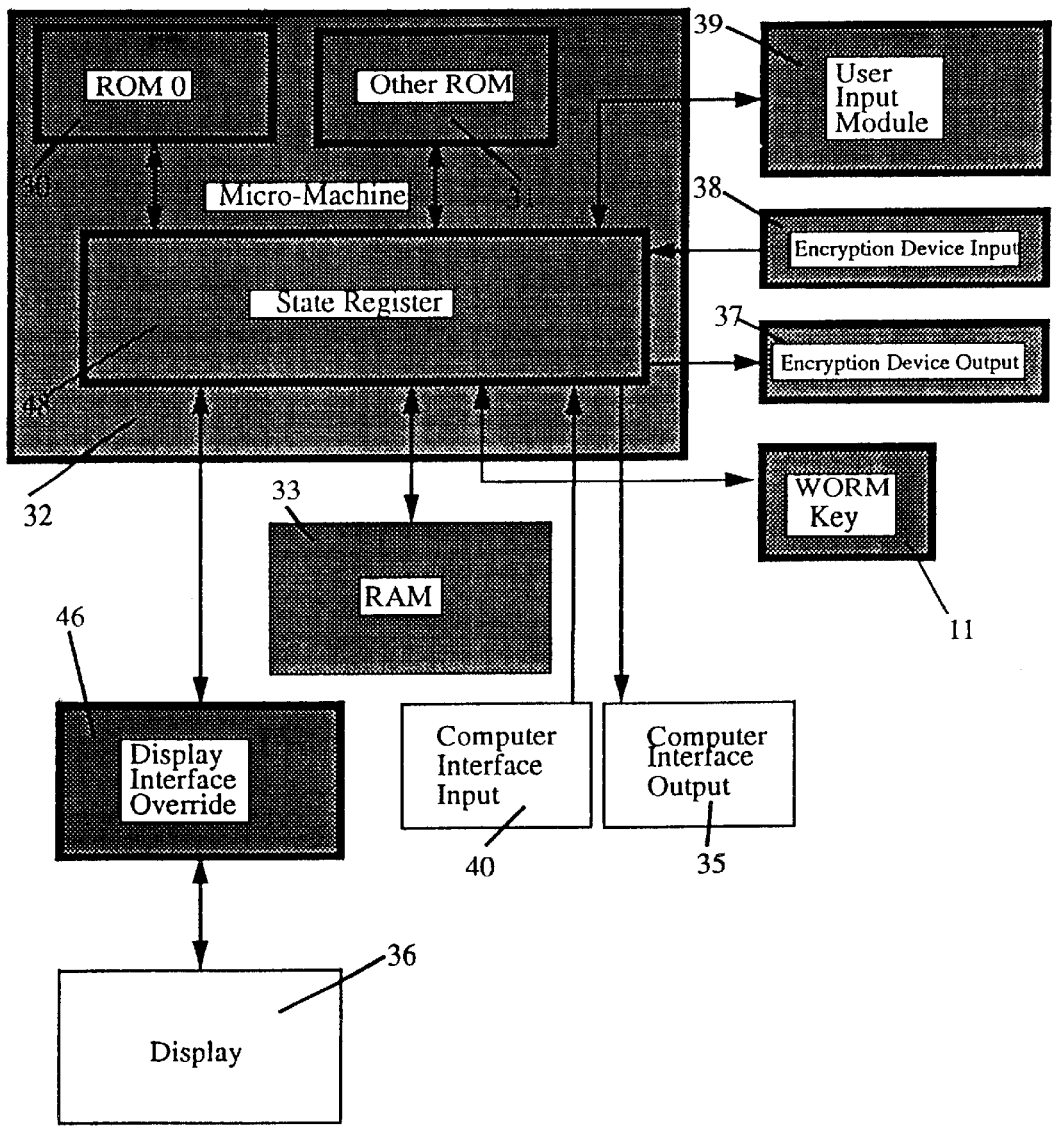
FIG. 6 depicts a variant of the Trusted Path Device to which a Worm Key can be fitted and an alternative encryption device other than the one which appears in these specifications can be used.

The TPS Device can be made to operate with many types of encryption device, one example of this variant is depicted in FIG. 6.

In this variant, device 11 (referred to as a Worm Key) is a physically detachable module which can be connected to the TPS device 32 in a similar manner to module 39. The contents of the Worm Key comprise in addition to a plurality of data items as previously described in relation to the encryption device, a set of random numbers called K numbers. The purpose of these numbers is similar to the Key Second Part 42. There exists a K number for each valid serial number spanned by the range of serial numbers defined by the current 21 and upper 19 or lower 20 serial numbers in their respective registers.

In this variant, the Trusted Path device takes on part of the role of the encryption device 12 of FIG. 2 by checking the Worm Key 11. The Trusted Path device updates the Worm Key, deletes the K number corresponding to the given serial number, and proceeds to calculate a checksum based on the concatenated message and K number. The resultant checksum is encrypted by passing it to the crypto engine. Note that the K number is not displayed or output from the TPS in any form. The key used by the crypto engine for encryption purposes is supplied by some mechanism indigenous to the particular implementation of that device.

In yet another variant, no K number is stored on the Worm Key, and no K number is used as part of the checksum calculation process. The TPS device checks and updates the Worm Key given an appropriate serial number, but then proceeds to merely calculate the checksum based on the message and other data, typically the classification supplied by the user and the serial number input with the message. The checksum is then encrypted using a key input by some mechanism indigenous to the implementation of the crypto engine. In this variant or others the crypto engine is not restricted to the use of asymmetric encryption algorithm; the use of an asymmetric algorithm such as public key is not precluded.

The crypto engine is used simply as an encryption service; no serial numbers are passed to it.

The contents of the Worm Key 11 can be encrypted in order to provide further security from theft and attempted misuse by unauthorised personnel. The one or more keys needed to decrypt the contents of the Worm Key 11 would be stored either in the rom 30 or rom 31, the ram memory 33, inside the crypto engine, or some specialised device which can be attached to the encryption engine.

Both the methods of encrypting the resultant checksum allow selective, transitive, and temporal granting and revocation of privileges.

For example, a range of serial numbers can represent the granting of the privilege to send, receive, or authenticate a specified quantity of messages. These messages can represent different commands or information such as the permission to transfer a certain quantity of funds. Each range of serial numbers can represent a different privilege to undertake some action.

By judicious distribution of serial number ranges, exclusive messages can be sent. More precisely, if two entities only have access to the same range of serial numbers, then only they can encrypt and decrypt data transformed using that range.

What is claimed is:

1. A trusted path device for controlling the transfer of received data between an untrusted data input, an untrusted visual display for displaying signals from an external source and a data output, comprising, a trusted visual display interface control means for transferring said received data from said untrusted data input to said untrusted visual display and controlling said display to display said received data thereon, an untrusted verifier means, having at least one user operable input signal actuator, for providing a first signal output from said verifier means upon actuation of a trusted first one of said actuators representative of a visual verification by the user that the data displayed on said untrusted visual display is received data, and a trusted processing means for receiving verifier means output and upon receiving said first signal output transferring said received data to said data output.

2. A trusted path device according to claim 1 wherein said verifier means is constructed so as to be detachable from said trusted path device.

3. A trusted path device according to claim 1 further comprising:

random access storage for storing the data displayed on said untrusted visual display prior to said visual display interface control means controlling said untrusted visual display to display data received from said untrusted data input.

4. A trusted path device according to claim 1 wherein a further one of said actuators is operable by a user to provide a signal output from said verifier means representative of a predetermined data classification associated with said received data by said processing means.

5. A trusted path device according to claim 1 wherein a further one of said actuators is operable by a user to provide a signal output from said verifier means representative of a predetermined digital signature which is associated with said received data by said processing means.

6. A trusted path device according to claim 1 wherein said trusted visual display interface control means includes means for converting said received data into a signal format suitable to be received by said untrusted visual display.

7. A trusted path device according to claim 1 wherein said processing means is controlled by a finite state automaton.

8. A trusted path device according to claim 1 wherein said processing means is controlled by a micro coded state machine having a predetermined instruction set.

9. A trusted path device according to claim 8 wherein said untrusted data input includes means for translating data protocol and format of said received data for input thereof into said processing means.

10. A trusted path device according to claim 1 wherein
   said received data comprises a uniquely associated data string and said processing means concatenates a first concatenation variable comprising said received data with a second concatenation variable comprising said data string and applies predetermined checksum algorithm to the resultant concatenation to provide a checksum which is uniquely associated with said data and transferable with said received data to said untrusted data output means.

11. A trusted path device according to claim 10 wherein said data string comprises a serial number uniquely associated with said received data.

12. A trusted path device according to claim 5 or 10 wherein said second concatenation variable comprises said predetermined digital signature provided by said verifier means which is unique to the trusted path device.

13. A trusted path device according to claim 5 or 10 wherein said second concatenation variable comprises said data string concatenated with said predetermined digital signature.

14. A trusted path device according to claim 4 or 10 wherein said second concatenation variable comprises said predetermined data classification provided by said verifier means.

15. A trusted path device according to claim 4 or 10 wherein said second concatenation variable comprises said data string concatenated with said predetermined data classification.

16. A trusted path device according to claim 10 further comprising a mass storage means for retrievably storing a plurality of data items, said data items comprising at least one key part which is uniquely associated with a data string, and wherein said processing means is adapted to retrieve from said mass storage means a key part associated with the said data string in said received data, and, causes to be encrypted according to a predetermined algorithm a first encryption variable comprising said checksum, to provide an encrypted trusted path output data string transferable to said untrusted data output.

17. A trusted path device according to claim 16 wherein said first encryption variable comprises said checksum concatenated with said received data.

18. A trusted path device according to claim 4 or 16 wherein said first encryption variable comprises said checksum concatenated with said predetermined classification.

19. A trusted path device according to claim 5 or 16 wherein said first encryption variable comprises said checksum concatenated with said predetermined signature.

20. A trusted path device according to claim 4, 5 or 16 wherein said first encryption variable comprises said checksum concatenated with said predetermined signature and said predetermined classification.

21. A trusted path device according to claim 1 wherein
said received data comprises a uniquely associated data string and mass storage means for retrievably storing a plurality of data items, said items comprising at least one key part which is uniquely associated with a data string, and said processing means is adapted to retrieve from said mass storage means a key part associated with the said data string in said received data, and, causes to be encrypted according to a predetermined algorithm said received data, with or without said data string using said key part, to provide encrypted received data transferable to said untrusted data output.

22. A trusted path device according to claim 21 wherein said uniquely associated data string comprises a serial number.

23. A trusted path device according to claim 21
further comprising a trusted storage device for retrievably storing at least one unique identification data string, and wherein said received data further comprises a uniquely associated identification data string, and said processing means is adapted to retrieve from said trusted storage device at least one of said unique identification data strings and comparing said data string with the data string in said received data and if they are equivalent and causing to be encrypted according to said predetermined algorithm said received data, with or without said data string using said key part, to provide encrypted received data transferable to said trusted data output means.

24. A trusted path device according to claim 21 further comprising an untrusted storage device for retrievably storing at least one unique identification data string, wherein said received data further comprises a uniquely associated identification data string, and said processing means comprises means for receiving from said untrusted storage device at least one of said unique identification data strings and comparing said data string with the data string in said received data and if they are equivalent and causing to be encrypted according to said predetermined algorithm said received data, with or without said data string using said key part, to provide encrypted received data transferable to said untrusted data output means wherein, said at least one unique identification data string and or said key part is encrypted according to a predetermined algorithm and predetermined key and which is caused to be decrypted by said processing means in accordance with said predetermined algorithm and a predetermined key before being compared by said processing means.

25. A trusted path device according to claim 4, 5 or 22 wherein said first encryption variable comprises said checksum concatenated with said predetermined signature and said predetermined classification and said received data.

26. A trusted path device according to claim 1, 21, 22, 16 or 17 wherein said key part is used to encrypt an element comprising either said received data, said data string, said checksum, said predetermined classification, said predetermined signature or any concatenated combination of said elements, has equal to or greater than the quantity of data bits contained in any of said elements or concatenated combination of said elements.

27. A trusted path device according to claim 1 further comprising:
a signal switch means, having at least two inputs and an output connected to said untrusted visual display means, for receiving said received data from said trusted visual display interface control means on a first of said at least two inputs and for receiving said display signals from said external source on a second of said at least two inputs, said signal switch means being controlled by said processing means to selectively connect either of said first or second inputs to said output.

28. A trusted path device according to claim 27 wherein said signal switch means comprises a relay having at least two inputs and an output.

29. A trusted path device according to claim 27 wherein said signal switch means comprises a solid state switch having at least two inputs and an output.

30. A trusted path device according to claim 27 wherein said signal switch means comprises means for switching composite video signals.

31. A trusted path device according to claim 27 wherein said signal switch means comprises means for switching R, G, B and synchronization signals.

32. A trusted path device according to claim 1 further comprising a trusted input means for 1) receiving data from a trusted external device, 2) transferring said received data to said trusted visual display interface control means under the control of said trusted processing means and 3) upon visual verification by the user of the data displayed on said untrusted visual display means as indicated upon said trusted processing means receiving said first signal output transferring said received data to a trusted output means for outputting said verified received data.

33. A trusted encryption device comprising
a trusted controller,
a trusted data input means for accepting received data comprising a data portion and a uniquely associated data string comprising a serial identifier,
an untrusted mass storage means for retrievably storing a plurality of data items, said items comprising at least one encryption key part which is uniquely associated with a data string comprising a serial identifier,
a trusted data string verifier having at least two registers, a first register containing a current serial identifier and a second register containing a serial identifier bound, wherein
said controller comprises means for determining whether said serial identifier in said received data is within the range determined by said current serial identifier and said serial identifier bound, in which event said control means (i) stores in said first register a current serial identifier calculated by incrementing said serial identifier in said received data a predetermined series increment towards said serial bound identifier, (ii) retrieves from said untrusted mass storage means a key part uniquely associated with said serial identifier in said received data, encrypting said data portion of said received data according to a predetermined encryption algorithm with said key part, and (iii) outputs an encrypted data portion having a uniquely associated said serial identifier.

34. A trusted encryption device according to claim 33 further comprising a trusted data output means for receiving said trusted control means output and translate said output into a predetermined output format for outputting from said trusted encryption device.

35. A trusted encryption device according to claim 33 wherein serial identifier is a serial number.

36. A trusted encryption device according to claim 33 wherein said data item further comprises a checksum calculated in accord to a predetermined algorithm applied to a combination of said at least one encryption key part and said serial identifier.

37. A trusted encryption device according to claim 33 wherein said controller comprises a finite state automaton.

38. A trusted encryption device according to claim 33 wherein after said controller comprises means for reading an encryption key part from said untrusted mass storage device, at least a portion of said mass storage device storing said encryption key part being altered so as to make said encryption key part unreadable.

39. A trusted encryption device according to claim 33 wherein said each of said encryption key parts is a random number.

40. A trusted encryption device according to claim 33 wherein said trusted data string verifier means is constructed so as to be detachable from said trusted encryption device.

41. A trusted encryption device according to claim 33 wherein said first register comprises a NVRAM and said second register comprises a ROM.

42. A trusted encryption device according to claim 33 wherein said trusted data string verifier means further comprises a third register containing a serial identifier bound opposite in the range of the serial identifier bound in the second register so that if the current serial identifier lies between the bound in said second register and the bound in said third register, said current serial identifier is defined by said controller to be a valid serial identifier.

43. A trusted encryption device according to claim 33 wherein said third register comprises a ROM or a portion thereof.

44. A trusted encryption device according to claim 33 wherein said untrusted mass storage means comprises an untrusted WORM disc reader device, a WORM interface and an untrusted WORM data storage disc containing said plurality of data items.

45. A trusted encryption device according to claim 44 further comprising means for, when each data item is retrieved from said untrusted WORM data storage disc, writing over at least a portion of said untrusted WORM data storage disc storing said encryption key part so as to make the data item unreadable after that data item has been read.

46. A trusted encryption device according to claim 45 wherein when said data item is written over with a predetermined data string.

47. A trusted encryption device according to claim 33 further comprising a means for decrypting having a predetermined decryption algorithm and predetermined decryption key, wherein
each of said at least one encryption key parts stored in said untrusted mass storage means is encrypted according to a respective encryption algorithm and key associated with said predetermined decryption algorithm and key in said decryption means, and before said at least one encryption key part is used by said controller to encrypt said data portion of said received data, said at least one encryption key is decrypted by said decryption means according to said predetermined decryption algorithm and key.

48. A trusted encryption device according to claim 47 wherein at least one of said registers contents in said trusted data string verifier means is encrypted according to a respective encryption algorithm and key associated with said predetermined decryption algorithm and key in said decryption means and before said at least one register content is used by said controller, said at least one register contents is decrypted by said decryption means according to said predetermined decryption algorithm and key.

49. A trusted encryption device according to claim 33 wherein said data item further comprises a checksum calculated according to a predetermined algorithm applied to a combination of said at least one encryption key part and a successor data item.

50. A trusted encryption device according to claim 49 wherein said combination comprises said at least one encryption key part and a portion of a successor data item.

51. A trusted encryption device according to claim 33 wherein said data item further comprises at least one respective second encryption key part which is also uniquely associated with a respective data string.

52. A trusted encryption device according to claim 33, 36, 49, 50 or 51 wherein said key part used to encrypt an element comprising either said received data, said data string comprising a serial number, said checksum or any concatenated combination of said elements, has equal to or greater than, the quantity of data bits contained in any of said elements alone or any concatenated combination of said elements.

53. A trusted encryption device according to claim 33 wherein said data item verifier means comprises at least one set of said at least two registers representative of one range of serial identifier ranges bounded by at least one respective current serial identifier and serial identifier bound, whereby a predetermined portion of said untrusted mass storage means is useable by various of said at least one range of serial identifier ranges.

54. A method of encrypting data comprising the steps of:
  a) storing a plurality of data items each comprising at least one encryption key, each of said keys being uniquely associated with a data string comprising a serial identifier in an untrusted mass storage device,
  b) storing a serial identifier bound in the first register of the trusted serial number verifier means,
  c) storing a current serial identifier in a second register of said trusted serial number verifier means,
  d) providing data input to a trusted control means comprising a data portion to be encrypted and a uniquely associated serial identifier,
  e) comparing in said trusted control means said serial identifier portion of said data input to said serial identifier to determine whether they are equal and whether said serial number portion is greater than or equal to said serial identifier bound,
  f) obtaining from said untrusted mass storage device a data item having an encryption key uniquely associated with said current serial identifier,
  g) adjusting said serial identifier in said received data a predetermined series increment towards said serial identifier bound,
  h) encrypting in said trusted control means said data portion of said data input uniquely associated with said current serial identifier, with a predetermined encryption algorithm using said random encryption key, and
  i) said trusted control-means providing a data output comprising an encrypted data portion associated with said serial identifier.

55. A method of encrypting data according to claim 54 further comprising the step of
  j) for each data item retrieved from untrusted data storage, writing over at least a portion of said data item so as to make the data item unreadable after that data item has been read.

56. A method of encrypting data according to claim 54 further comprising the steps of:
  k) storing a uniquely associated checksum with each of the said data items, said checksum being calculated by applying a predetermined checksum algorithm using as its input a current data item and at least a portion or the whole of the successor data item, and
  l) applying said predetermined checksum algorithm to said encryption key uniquely associated with said current serial identifier, and said associated current serial identifier and said successor data item and determining whether the checksum produced is the same as the checksum of that data item, and if so allowing step g) to be performed followed by successive steps h) and i).

57. A method of encrypting data according to claim 54 further comprising the steps of:
  m) storing a uniquely associated checksum with each of the said data items, said checksum being calculated by applying a predetermined checksum algorithm using as its input a current data item, and
  n) applying said predetermined checksum algorithm to said encryption key uniquely associated with said current serial identifier, and said associated current serial identifier and determine whether the checksum produced is the same as the checksum of that data item, and if so allowing step g) to be performed followed by successive steps h) and i).

58. A method of encrypting data according to claim 54 further comprising the steps of:
  o) before performing step a), encrypting the encryption key of a data item with a predetermined key and encryption algorithm, and the step p) which falls between steps e) and t), and
  p) decrypting the encrypted encryption key of a retrieved data item.

* * * * *

UNITED STATES PATENT AND TRADEMARK OFFICE
CERTIFICATE OF CORRECTION

PATENT NO. : 6,836,548 B1
DATED : December 28, 2004
INVENTOR(S) : Anderson et al.

It is certified that error appears in the above-identified patent and that said Letters Patent is hereby corrected as shown below:

<u>Title page,</u>
Item [*] Notice, delete "Subject to any disclaimer, the term of this patent is extended or adjusted under 35 U.S. 154(b) by 1,826 days."

Signed and Sealed this

Nineteenth Day of April, 2005

JON W. DUDAS
*Director of the United States Patent and Trademark Office*